US012039797B2

(12) United States Patent
Higa et al.

(10) Patent No.: US 12,039,797 B2
(45) Date of Patent: *Jul. 16, 2024

(54) DISPLAY CONDITION ANALYSIS DEVICE, DISPLAY CONDITION ANALYSIS METHOD, AND PROGRAM RECORDING MEDIUM

(71) Applicant: NEC Corporation, Tokyo (JP)

(72) Inventors: Kyota Higa, Tokyo (JP); Ruihan Bao, Tokyo (JP); Takami Sato, Tokyo (JP); Ryota Mase, Tokyo (JP); Kota Iwamoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/089,759

(22) Filed: Dec. 28, 2022

(65) Prior Publication Data

US 2023/0138264 A1 May 4, 2023

Related U.S. Application Data

(63) Continuation of application No. 16/776,103, filed on Jan. 29, 2020, now Pat. No. 11,594,052, which is a
(Continued)

(30) Foreign Application Priority Data

Mar. 12, 2014 (JP) .................................. 2014-049001

(51) Int. Cl.
*G06V 20/80* (2022.01)
*G06F 16/583* (2019.01)
(Continued)

(52) U.S. Cl.
CPC .......... *G06V 20/80* (2022.01); *G06F 16/5838* (2019.01); *G06Q 10/087* (2013.01);
(Continued)

(58) Field of Classification Search
None
See application file for complete search history.

(56) References Cited

U.S. PATENT DOCUMENTS 9,890,994 B2\* 2/2018 Kim ........................ F25D 29/00
9,915,471 B2\* 3/2018 Kim ........................ F25D 29/00
(Continued)

FOREIGN PATENT DOCUMENTS

| CN | 101809601 A | 8/2010 |
| CN | 102369560 A | 3/2012 |

(Continued)

OTHER PUBLICATIONS

International Search Report of PCT Application No. PCT/JP2015/000775 mailed Apr. 7, 2015.
(Continued)

*Primary Examiner* — Nancy Bitar

(57) ABSTRACT

Disclosed is a display condition analysis device which is capable of analyzing the display conditions of products. This display condition analysis device is provided with: a product recognition means for recognizing, from a display image taken of products on display, the products in the display image; and a display condition analysis means for analyzing, on the basis of the positions of the recognized products, the display conditions of the products on display.

11 Claims, 10 Drawing Sheets

Related U.S. Application Data continuation of application No. 15/124,851, filed as application No. PCT/JP2015/000775 on Feb. 19, 2015, now Pat. No. 10,586,101.

(51) Int. Cl.
  *G06Q 10/087* (2023.01)
  *G06Q 30/06* (2023.01)
  *G06V 20/64* (2022.01)
  *G06V 20/68* (2022.01)

(52) U.S. Cl.
  CPC ............ *G06Q 30/06* (2013.01); *G06V 20/64* (2022.01); *G06V 20/68* (2022.01)

(56) References Cited

U.S. PATENT DOCUMENTS

| | | |
|---|---|---|
| 2008/0077510 A1 | 3/2008 | Dielemans |
| 2013/0051667 A1 | 2/2013 | Deng et al. |
| 2014/0286619 A1 | 9/2014 | Nakagome et al. |
| 2015/0003729 A1 | 1/2015 | Hayashi |
| 2015/0154449 A1* | 6/2015 | Ito ..................... G06K 9/00375 382/103 |
| 2015/0181126 A1 | 6/2015 | Harada |
| 2015/0365660 A1 | 12/2015 | Wu et al. |
| 2016/0300181 A1* | 10/2016 | Iwai ....................... G06Q 30/06 |

FOREIGN PATENT DOCUMENTS

| | | |
|---|---|---|
| JP | 5-81552 | 4/1993 |
| JP | 2003-230131 | 8/2003 |
| JP | 2006-59038 | 3/2006 |
| JP | 2012-193873 | 3/2011 |
| JP | 2012-174154 | 9/2012 |
| JP | 2012193673 | 10/2012 |

OTHER PUBLICATIONS

Chinese Office Action for CN Application No. 2015800128718 dated on Dec. 3, 2018 with English Translation.

Shingo Ando et al., "Development of Simple Feature Measurement by using Mixed Single Camera", The Institute of Image Information and Television Engineers, ITE Technical Report vol. 36, No. 8, ME2012-4, Feb. 18, 2012.

\* cited by examiner

ARTICLE RECOGNITION

ESTIMATING THE FACE LINE

DISPLAY CONDITION ANALYSIS DEVICE, DISPLAY CONDITION ANALYSIS METHOD, AND PROGRAM RECORDING MEDIUM

CROSS-REFERENCE TO RELATED PATENT APPLICATIONS

This application is a continuation of U.S. patent application Ser. No. 16/776,103, filed Jan. 29, 2020, which is a continuation of U.S. patent application Ser. No. 15/124,851, filed Sep. 9, 2016, which issued as U.S. Pat. No. 10,586,101, which is a National Stage Entry of International Application No. PCT/JP2015/000775, filed Feb. 19, 2015, which claims priority from Japanese Patent Application No. 2014-049001, filed Mar. 12, 2014. The entire contents of the above-referenced applications are expressly incorporated herein by reference.

TECHNICAL FIELD

The present invention relates to a display condition analysis device and a display condition analysis method that analyze a display condition of articles, and to a program recording medium.

BACKGROUND ART

Since products displayed in a supermarket or a convenience store are sold generally from products at a front line on a display shelf, a vacancy is generated at the front on the shelf as time elapses. For this reason, a clerk periodically walks around to appropriately do work such as supplying of products and what is called "taking out to front" to make arrangement on the display shelf.

PTL 1 describes a stock condition management method of notifying a clerk of a stock condition of products when the product runs out on a display shelf. In the management method described in PTL 1, a real-time camera monitors an image of the display shelf of products, and when a product nonexistence marker provided on the display shelf is detected, a product related to the product nonexistence marker is specified to output a message indicating that the stock is being checked.

Further, PTL 2 discloses a product monitoring system in which a camera captures an image of a display state of products on a display shelf, the image is analyzed, and on the basis of time sequence change of the analysis result, a timing of supplying products is notified.

CITATION LIST

Patent Literature

PTL 1: Japanese Patent Application Laid-open Publication No. 2012-174154
PTL 2: Japanese Patent Application Laid-open Publication No. 1993-081552

SUMMARY OF INVENTION

Technical Problem

There is a limit for a clerk to always continue monitoring a display condition in a store. Continuance of nonexistence of products on a display shelf despite existence of products in a backyard, however, results in loss of a selling opportunity. Even when products remain on the display shelf, in a case that arrangement of the products is in disorder, this discourages a consumer from buying, possibly resulting in loss of a selling opportunity likewise.

In the method described in PTL 1, since a product nonexistence marker related to each product is set on the display shelf, there is a problem that a position where products are displayed cannot be flexibly changed. In the system described in PTL 2, since accurate analysis result cannot be obtained when an image of all ground surfaces at respective stages of the product shelf is not captured, there is a problem that a location for capturing the image is limited.

In view of the above, an object of the present invention is to provide a display condition analysis device and a display condition analysis method that can analyze a display condition of articles, and a program recording medium.

A display condition analysis device according to the one aspect of the present invention includes:
 article recognition means for recognizing, from a captured display image of a displayed article, the article in the display image; and
 display condition analysis means for analyzing a display condition of the displayed article, based on a position of the recognized article.

A display condition analysis method according to the one aspect of the present invention includes, by a display condition analysis device:
 recognizing, from a captured display image of a displayed article, the article in the display image, and
 analyzing a display condition of the displayed article based on a position of the recognized article.

A program recording medium according to the one aspect of the present invention, the program recording medium recording a display condition analysis program causing a computer to execute:
 an article recognition process of recognizing, from a captured display image of a displayed article, the article in the display image; and
 a display condition analysis process of analyzing a display condition of the displayed article based on a position of the recognized article.

Advantageous Effects of Invention

According to the present invention, a display condition of articles can be analyzed.

DESCRIPTION OF EMBODIMENTS

Figure 1:
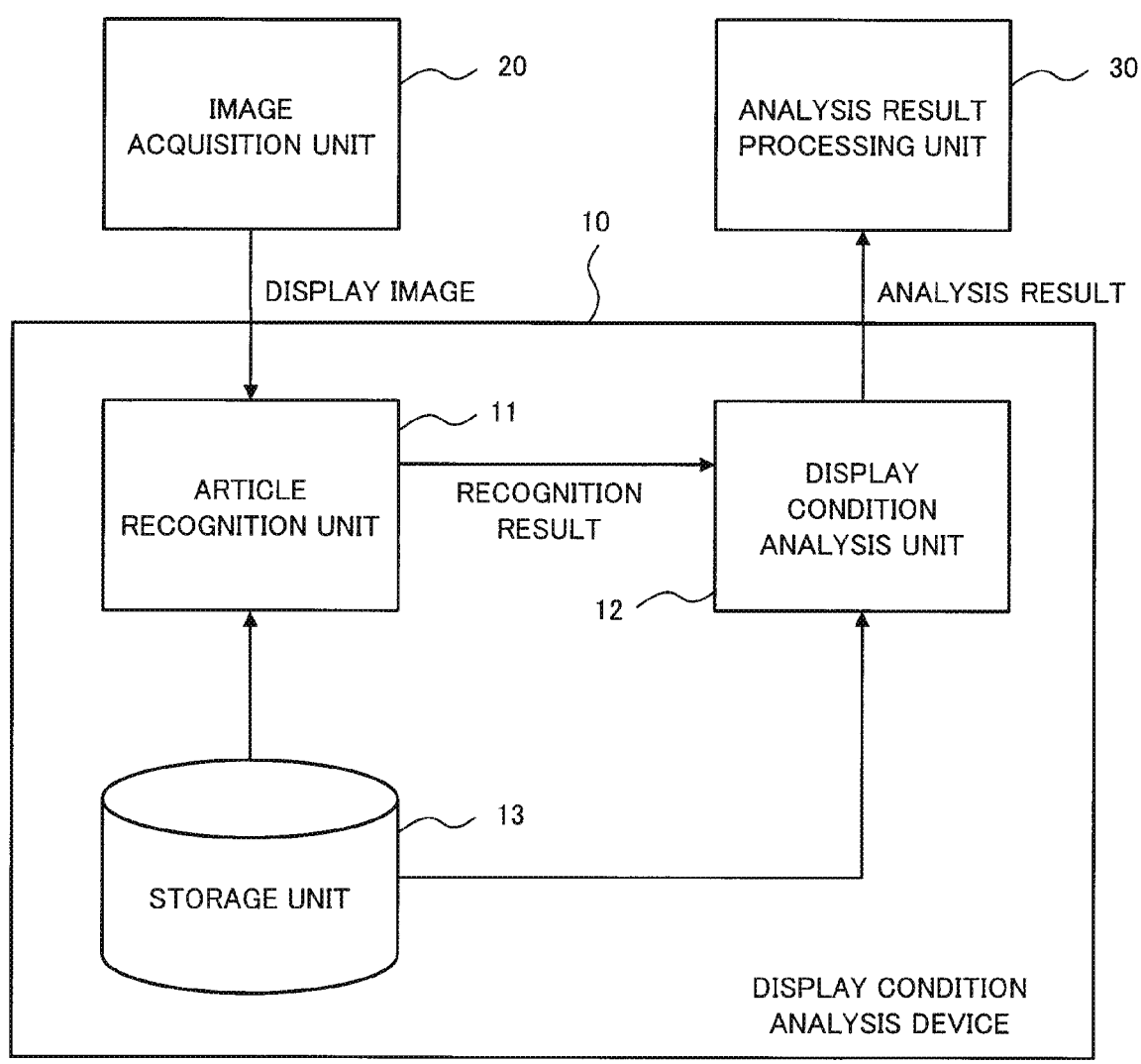
FIG. 1 is a block diagram illustrating a configuration example of a first exemplary embodiment of a display condition analysis device according to the present invention.

Referring to the drawings, the following describes exemplary embodiments of the present invention.

Exemplary Embodiment 1

FIG. 1 is a block diagram illustrating a configuration example of a first exemplary embodiment of a display condition analysis device according to the present invention. The display condition analysis device 10 of the present exemplary embodiment receives from an image acquisition unit 20 a display image of articles displayed on a display shelf, and outputs a display condition of the display shelf to an analysis result processing unit 30.

The image acquisition unit 20 is implemented by, e.g., a fixed-point camera or the like for always monitoring the display shelf. It is however unnecessary that the image acquisition unit 20 itself includes a function of capturing an image. For example, the image acquisition unit 20 may be an interface that receives via a communication network an image captured by a camera (not illustrated) capturing an image of the display shelf.

The image acquisition unit 20 may periodically supply a display image to the display condition analysis device 10, or may supply a display image to the display condition analysis device 10 in accordance with a command of a managing person or the like. For example, the image acquisition unit 20 may also supply to the display condition analysis device 10 the time that the display image is captured.

The analysis result processing unit 30 outputs a display condition of articles analyzed by the display condition analysis device 10. The display condition obtained by the display condition analysis device 10 of the present exemplary embodiment includes not only information indicating a condition itself of display of articles, such as display disorder, but also, e.g., an alarm output in accordance with the analyzed display condition. In other words, the display condition in the present exemplary embodiment can be expressed as information associated with a display condition, such as display disorder and the alarm. Modes in which the analysis result processing unit 30 outputs the display condition are described below. A display condition analysis unit 12 described below may perform the process (i.e., the process of outputting a display condition of articles) of the analysis result processing unit 30.

Accordingly, the display condition analysis device 10, the image acquisition unit 20, and the analysis result processing unit 30 cooperate with each other so that a condition of the display shelf can be recognized. Thus, a configuration including the display condition analysis device 10, the image acquisition unit 20, and the analysis result processing unit 30 can be called a display condition analysis system.

The display condition analysis device 10 includes an article recognition unit 11, the display condition analysis unit 12, and a storage unit 13.

The article recognition unit 11 recognizes articles in a display image. Concretely, the article recognition unit 11 identifies the article from the display image to recognize positions, sizes, ranges, and the like of the articles. In the following, information that specifies the articles recognized by the article recognition unit 11, and the positions, the sizes, the ranges, and the like of these articles is written as an article recognition result. For example, the article recognition result is information indicating the ranges of the recognized articles.

The article recognition unit 11 may, e.g., template-match the articles existing in the display image, with images of the articles stored in the storage unit 13, to thereby recognize the articles. A method in which the article recognition unit 11 recognizes the articles in the image is not however limited to the template-matching. The article recognition unit 11 may use another widely known method to recognize the articles in the display image.

Figure 2:
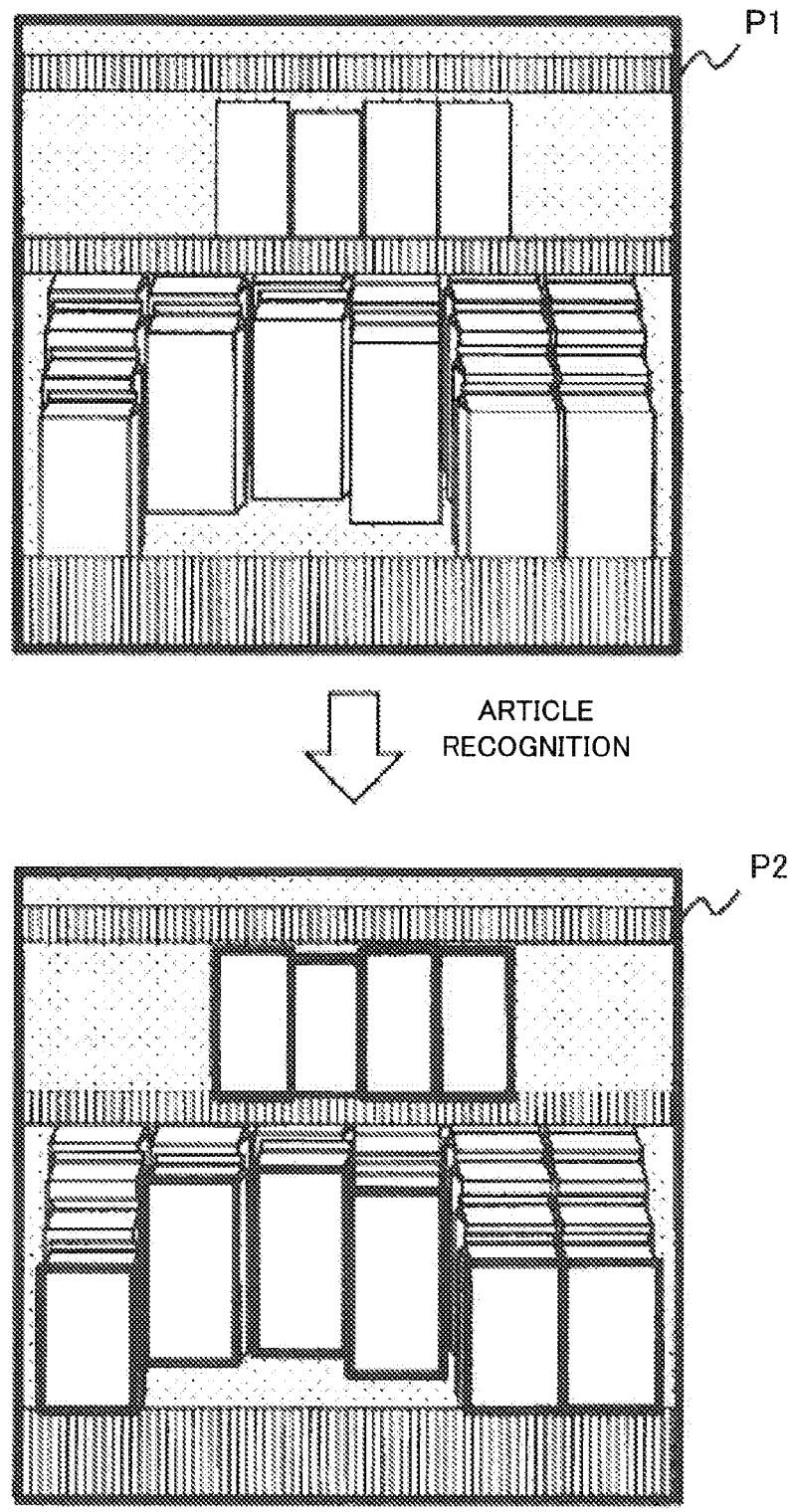
FIG. 2 illustrates an example of a process of recognizing articles from a display image.

FIG. 2 illustrates an example of a process of recognizing articles from a display image. When the display image P1 exemplified in FIG. 2 is input, the article recognition unit 11 recognizes the articles from the display image P1. The regions designated by the rectangles of the thick frames in the display image P2 exemplified in FIG. 2 are regions of the articles specified as the article recognition result.

The article recognition unit 11 supplies the display image and the article recognition result to the display condition analysis unit 12.

The display condition analysis unit 12 analyzes a display condition of the displayed articles. Concretely, on the basis of positions of the recognized articles, the display condition analysis unit 12 analyzes the display condition of the displayed articles and outputs the analysis result. The display condition outputted by the display condition analysis unit 12 includes the information associated with the display condition, such as display disorder and the alert, as described above.

The above-described position of the recognized article includes not only an absolute position of the article recognized from the display image, but also the following. That is, the position of the article includes, e.g., a relative position or positional relation to another article, a point or face specified from the recognized article, a line specified by connecting the positions of the recognized respective articles to each other, and a range (area) specified from this line and an additional line. For example, when the point specified from the recognized article, and a reference line exist in the display image, the position of the article is recognized from this point and the reference line.

For example, the display condition analysis unit 12 may calculate depths where the recognized articles are positioned, analyze a display condition of the displayed articles and output the result. The depth where the article is positioned means a degree of separation from a position (written as a reference position in the following) appropriate as a position where the article is displayed. For example, in the case of the display shelf, when the most front line of each display shelf is defined as the reference position, the depth where the article is positioned is a distance in the depth direction from the most front line of the display shelf. In the following description, calculation of a depth where the article is positioned is sometimes written simply as calculation of a depth.

As described above, products are generally sold from the more front line of the display shelf. For this reason, as the number of the products decreases, the products on the display shelf remain at deeper positions. As the positions of the articles existing on the display shelf are deeper, it is more difficult for a consumer to see the products. For this reason, this is undesirable for a display condition of articles. In other words, as depths where the articles are positioned are short (i.e., the articles exist on the nearer side on the display shelf), a display condition can be regarded as better. Accordingly, in the following description, the display condition analysis unit 12 analyzes a display condition from the depths where the recognized articles are positioned.

In the first exemplary embodiment, the display condition analysis unit 12 calculates depths on the basis of degrees of separation between the positions of the recognized articles and the reference position. The position for indicating the article is determined in advance for each kind of the articles. Since a height and a width of the articles vary among respective kinds of articles, a center of a base of the article may be defined as the position of the article, for example.

For example, when a display image is an image captured by the fixed-point camera, the display condition analysis unit 12 may specify, in advance, the position of the most front line of the display shelf on the basis of a view angle of the camera, a distance between the camera and the display shelf, and the like. When a range for which a display image is captured is not fixed, the display condition analysis unit 12 may estimate a position of the display shelf from the display image and set the estimated position of the display shelf as the reference position.

The display condition analysis unit 12 calculates depths where the articles are positioned, on the basis of distances between the positions of the recognized articles and the reference position. For example, when the most front line of a display shelf is defined as the reference position, the display condition analysis unit 12 may calculate as the depths distances between a line designating the most front line and the positions of the articles.

The display condition analysis unit 12 may calculate only the depths to determine appropriateness of a display condition of the articles, on the basis of the result of the calculation of the depths. For example, as the sum of distances (i.e., depths) of the respective articles from the reference position is smaller, the display condition analysis unit 12 may determine that the display condition is more appropriate.

The display condition analysis unit 12 supplies the analysis result to the analysis result processing unit 30. For example, the display condition analysis unit 12 may supply, to the analysis result processing unit 30, as the analysis result, information indicating the position of the article whose degree of separation from the reference position is larger than a predetermined reference. The display condition analysis unit 12 may supply, to the analysis result processing unit 30, as the analysis result, information indicating the positions of all articles and the degrees of separation from the reference position. The analysis results cited here are examples, and the display condition analysis unit 12 may supply arbitrary information necessary for the process performed by the analysis result processing unit 30 as the analysis result.

The analysis result processing unit 30 uses the analysis result supplied from the display condition analysis unit 12, to perform an arbitrary process for expressing a display condition. For example, the analysis result processing unit 30 may use the analysis result to output an image in a mode that enables recognition of the calculated depths where the articles are positioned.

Figure 3:
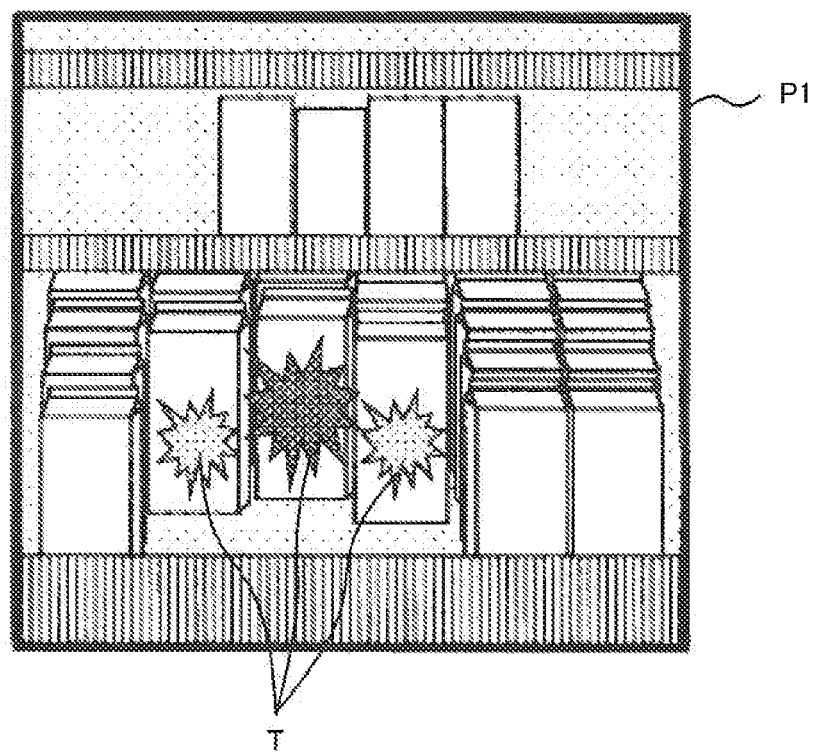
FIG. 3 illustrates an example of an output result from an analysis result processing unit.

FIG. 3 illustrates an example of the output result from the analysis result processing unit 30. The example illustrated in FIG. 3 represents that the analysis result processing unit 30 superimposes and displays blinking images T at the positions that are in the display image P1 and that indicate the articles whose degrees of separation from the reference position are larger than the predetermined reference.

Additionally, the analysis result processing unit 30 may communicate the relevant person the alert indicating that it is the timing for supplying articles. When the display shelf has a function of changing the inclination, for example, the analysis result processing unit 30 may communicate information indicating the positions or the like of the articles to a device (not illustrated) controlling the display shelf so as to cause the device to automatically incline the display shelf to move the articles forward.

The analysis result processing unit 30 may calculate a sold quantity of the articles on the basis of the depth where the article is positioned, a size of the article itself, and the like, and thereby automatically perform a process of making an order in accordance with the sold quantity. This is because the articles disappear from the near side on the display shelf is considered to be sold.

The analysis result processing unit 30 may estimate a disorder situation in a shop on the basis of the analysis result of the respective articles, and e.g., may collect the situation so as to enable comparison between or among plural shops.

The storage unit 13 stores information necessary for the process of recognizing the articles and the process of calculating the depths. For example, the storage unit 13 may store a captured image of the article to be displayed, and a size of the article. The storage unit 13 may store a position and a view angle of the camera capturing a display image, and parameter information indicating an image capturing range. For example, the storage unit 13 is implemented by a magnetic disk or the like.

The article recognition unit 11 and the display condition analysis unit 12 are implemented by a central processing unit (CPU) of a computer operating in accordance with a program (display condition analysis program). For example, the program is stored in the storage unit 13, and the CPU reads the program to operate as the article recognition unit 11 and the display condition analysis unit 12, in accordance with the program.

The article recognition unit 11 and the display condition analysis unit 12 may be each implemented by dedicated hardware. Meanwhile the present exemplary embodiment exemplifies the case where the analysis result processing unit 30 is not included in the display condition analysis device 10, the display condition analysis device 10 may include the analysis result processing unit 30.

Figure 4:
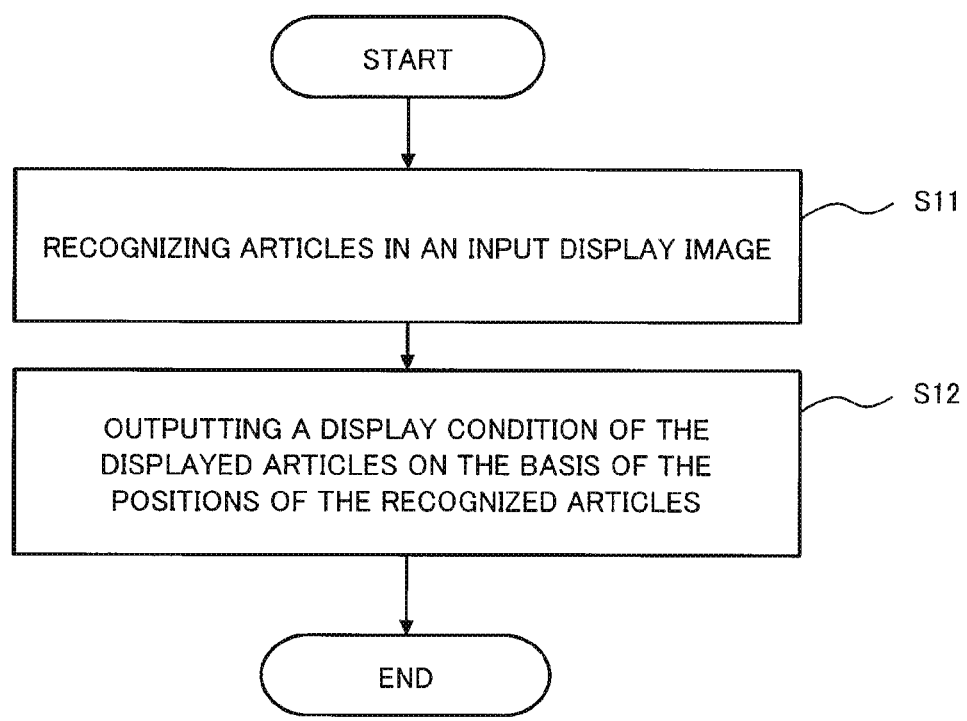
FIG. 4 is a flowchart illustrating an operation example of the display condition analysis device of the first exemplary embodiment.

Next, description is made about operation of the display condition analysis device 10 of the present exemplary embodiment. FIG. 4 is a flowchart illustrating an operation example of the display condition analysis device 10 of the first exemplary embodiment.

The article recognition unit 11 recognizes articles in a display image from the display image inputted from the image acquisition unit 20 (step S11). On the basis of the positions of the recognized articles, the display condition analysis unit 12 then analyzes a display condition of the displayed articles (step S12). Concretely, the display condition analysis unit 12 may calculate the depths where the recognized articles are positioned and analyze the display condition of the displayed articles, or may calculate the depths on the basis of degrees of separation between the positions of the recognized articles and the reference state.

As described above, according to the present exemplary embodiment, the display condition analysis unit 12 analyzes a display condition of displayed articles, on the basis of positions of the recognized articles. Concretely, the display condition analysis unit 12 calculates depths where the articles recognized in a display image are positioned and analyzes the display condition. For example, the display condition analysis unit 12 calculates the depths where the articles are positioned, on the basis of distances between the positions of the recognized articles and the reference position. This configuration enables analysis of a display condition of articles. Thus, on the basis of the analyzed display condition, lack of products and disorder in a shop can be detected and suppressed so that an advantageous effect can be obtained in that loss of selling opportunities can be reduced, and sales can be improved. Further, according to the exemplary embodiment, since the depths can be calculated without using a special image-capturing device, an advantageous effect can be obtained in that its introduction is easy.

Next, a modified example of the present exemplary embodiment is described. In the first exemplary embodiment, the above description is made about the case where the most front line on each display shelf is defined as the reference position. Display of articles includes display in which articles are stacked in multistage, not in only single stage. In this case, the display condition analysis unit 12 may set a line connecting upper ends of the respective articles to each other as the reference position, the each articles existing at one stage lower than a stage where the article can be further stacked.

Figure 5:
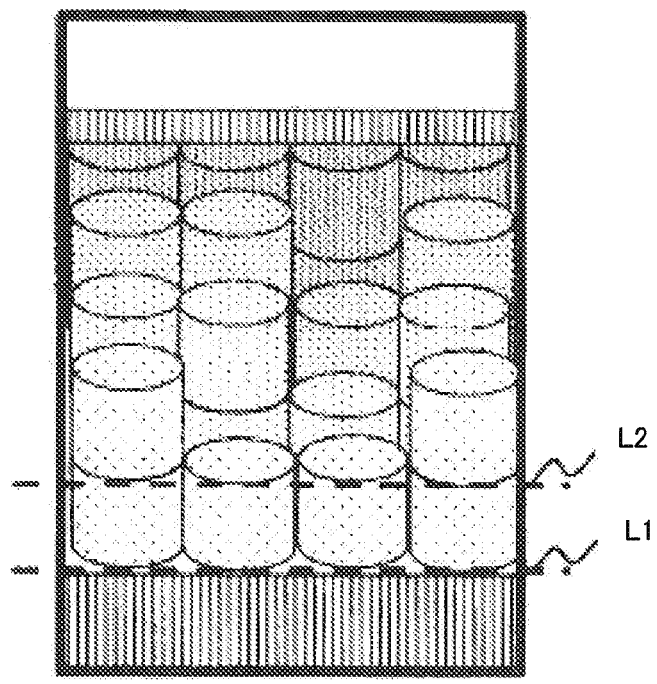
FIG. 5 illustrates an example of a reference position.

FIG. 5 illustrates an example of the reference position. The reference line L1 indicates the most front line of the display shelf. The reference line L2 indicates a line connecting upper bases of articles at the first stage included in articles displayed at the most front line. Thus, the separate reference positions are set so that a display condition of the stacked articles can be also determined in the same manner as described above.

Such definition of the reference position enables also calculation of the depths of positions of articles that are stacked in multistage to be displayed. For this reason, even when styles of shops are diversified, orderliness degrees of the shops can be determined.

Exemplary Embodiment 2

Next, description is made about a second exemplary embodiment of a display condition analysis device according to the present invention. A configuration of the display condition analysis device of the present exemplary embodiment is the same as that of the first exemplary embodiment.

In the second exemplary embodiment, the display condition analysis unit 12 calculates depths on the basis of a degree of separation between a line connecting positions of recognized respective articles to each other and a comparison reference line. In the following, the line connecting positions of recognized respective articles to each other is written as "face line". A method of determining the position of the article is the same as the method used in the first exemplary embodiment. The display condition analysis unit 12 may estimate the face line, using the technique used in the Hough transform.

Figure 6:
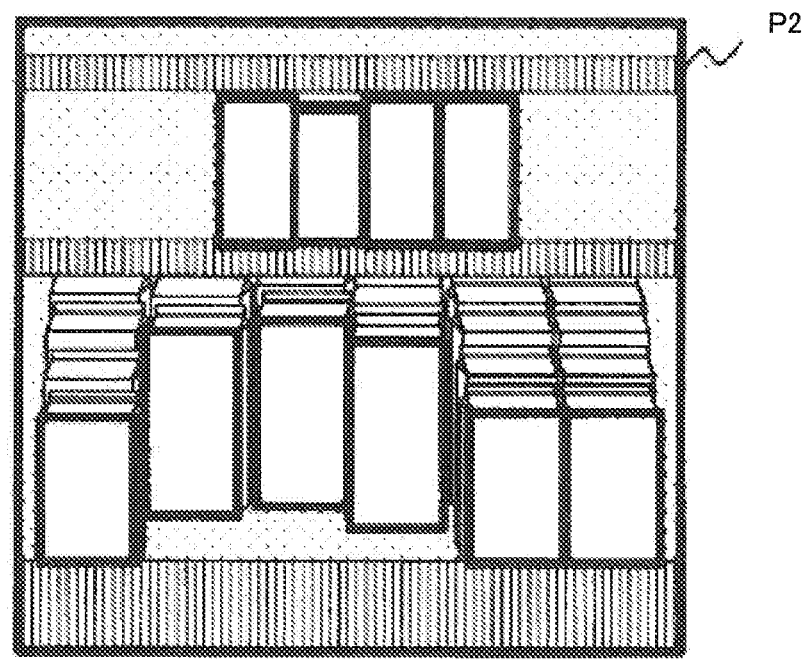
FIG. 6 illustrates examples of face lines.
Figure 6:
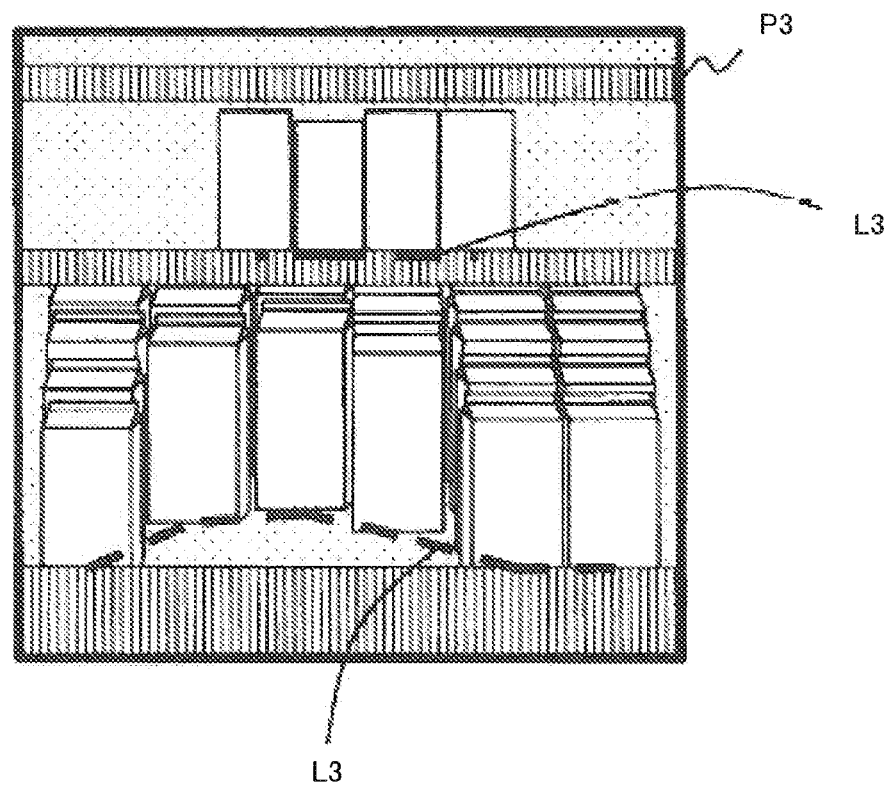

FIG. 6 illustrates an example of the face line. When positions of respective articles are recognized as exemplified in the display image P2, the display condition analysis unit 12 estimates the face lines L3 indicated by the broken lines in the display image P3.

The comparison reference line used in the second exemplary embodiment may be an arbitrary line that can be extracted from the display image, or may be a line defined independently of the display image. For example, when the comparison reference line is defined as a simple straight line, the display condition analysis unit 12 may calculate depths on the basis of a degree of distortion of a face line connecting positions of articles to each other.

For example, when the straight line indicating the most front line of each display shelf is defined as the comparison reference line, the display condition analysis unit 12 may calculate a depth on the basis of a distance between each point on the face line and the comparison reference line, in the same manner as in the first exemplary embodiment.

In a state where display of articles is not in disorder, the articles are usually displayed in line so that a specified face line is almost straight. In other words, from the straightness of the face line, it is possible to determine that pick-out of articles from a backyard and forward shift of articles have been done. Meanwhile, when display of articles is in disorder, the face line is not straight, and is distorted or stepwise. In other words, from non-straightness of the face line meaning that there is a possibility of shortage of stock or stock-out, it is possible to determine that alert needs to be generated.

In other words, as a shape of a face line is closer to a straight line (i.e., difference from the comparison reference line is small), a display state of articles can be regarded in a good situation. Accordingly, the display condition analysis unit 12 specifies such a face line to thereby analyze a display condition.

Figure 7:
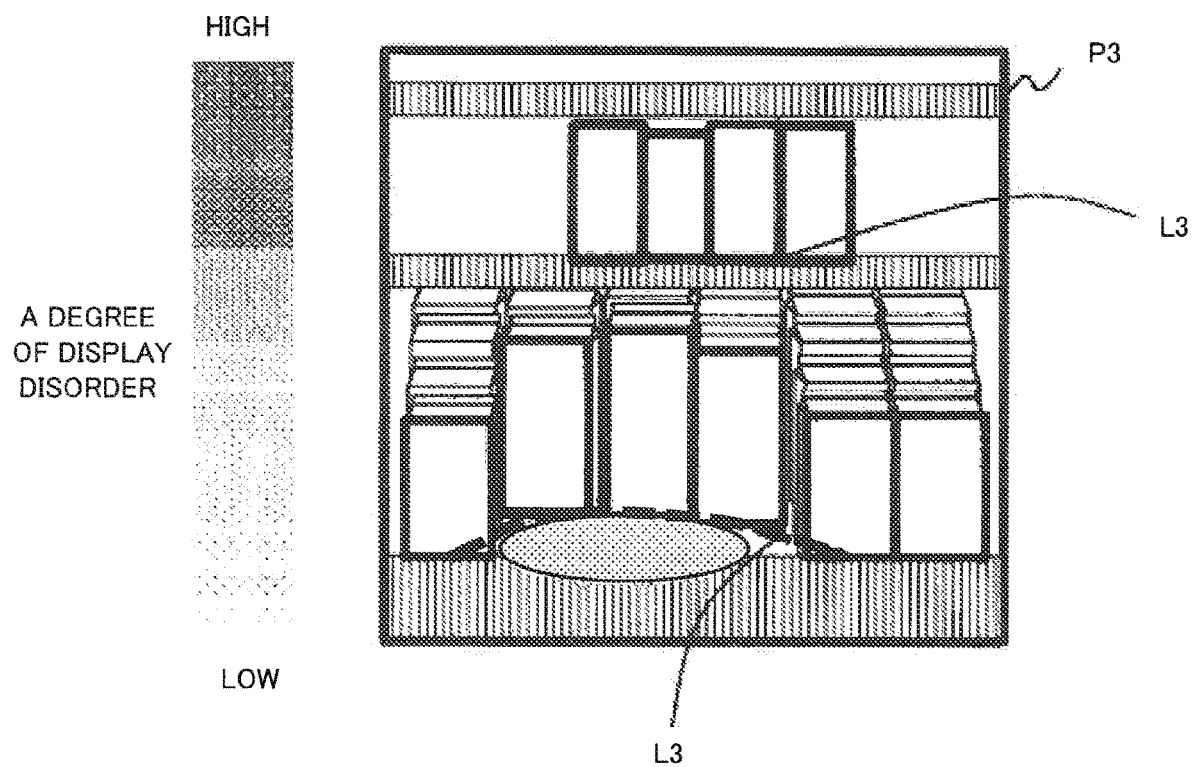
FIG. 7 illustrates another example of an output result from the analysis result processing unit.

FIG. 7 illustrates another example of an output result from the analysis result processing unit 30. The analysis result processing unit 30 superimposes and displays on the original display image a face line estimated by the display condition analysis unit 12. In the example illustrated in FIG. 7, since displayed articles are in disorder, the face line has a shape of a polygonal line. For example, in a state where displayed articles are not in disorder, an almost straight face line is superimposed in the display image.

In the example illustrated in FIG. 7, the analysis result processing unit 30 superimposes at a position of a long depth the image indicating disorder of display. Thus, in accordance with a degree of the disorder, the analysis result processing unit 30 may change a superimposed image. Concretely, the analysis result processing unit 30 may superimpose an image enabling recognition of a separation degree, at a position where a distance of separation from the comparison reference line is larger. For example, the analysis result processing unit 30 may superimpose and display on the display image an image that is color-coded in accordance with a magnitude of display disorder, like a heat map.

Although FIG. 7 illustrates the example in which an additional image is superimposed without transforming the original display image, the analysis result processing unit 30 may transform the original display image itself. For example, the analysis result processing unit 30 may perform transformation process for changing an image contrast of a part where an article displayed in disorder appears, to thereby emphasize the disorder situation. The disorder of the display shelf is made visible in this manner so that a condition of the entire display shelf can be easily recognized.

As described above, in the present exemplary embodiment, the display condition analysis unit 12 calculates depths where the articles are positioned, on the basis of a degree of separation between the face line and the comparison reference line. Even such a configuration can analyze a display condition of articles in the same manner as in the first exemplary embodiment.

Exemplary Embodiment 3

Next, description is made about a third exemplary embodiment of a display condition analysis device according to the present invention. A configuration of the display condition analysis device of the present exemplary embodiment is also the same as that of the first exemplary embodiment.

In the third exemplary embodiment, the display condition analysis unit 12 sets the sizes of respective articles recognized from a captured display image of the articles displayed at designated positions as reference states and calculates depths where articles are positioned, on the basis of a degree of separation between the sizes of the respective articles in the reference state and sizes of the respective articles recognized from a newly captured display image. For example, the display condition analysis unit 12 may use sizes of respective articles recognized from a display image as the reference state when they are displayed at positions suitable as the designated positions. The suitable positions mean positions appropriate as displayed positions, e.g., the most front line on a display shelf. In the following, an image of each article recognized from a display image when they are displayed at the suitable positions is written as a reference image. The reference images are stored in the storage unit 13, for example.

It is generally appropriate that articles are displayed at the nearest on a display shelf. For example, when an image of articles is horizontally captured by a fixed-point camera or the like, the article existing on the near side becomes larger in a captured image than the article existing on the deep side. In other words, an article positioned on the deeper side becomes smaller in size in a captured image. Accordingly, a captured image of an article at the most front line on the display shelf may be set as the reference image.

The display condition analysis unit 12 may calculate a depth on the basis of a difference (separation degree) between an image of a recognized article and the reference image. At this time, the display condition analysis unit 12 may calculate a depth in accordance with a ratio between the image of the recognized article and the reference image, on the basis of a view angle of a camera capturing the display image, a distance from the camera to the display shelf, and the like.

Figure 8:
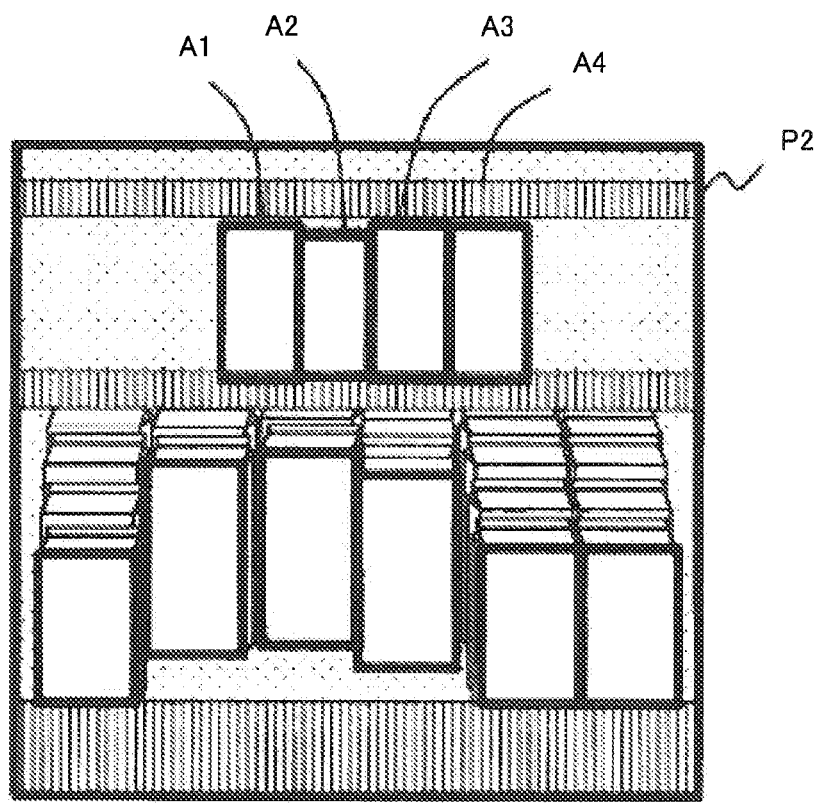
FIG. 8 illustrates another example of the process of recognizing articles from a display image.

FIG. 8 illustrates another example of a process of recognizing articles from a display image. In the example illustrated in FIG. 8, it is assumed that an article A1, an article A3, and an article A4 are displayed at the most front side on the display shelf, and an article A2 is positioned on the deeper side of the other articles.

In the upper-stage shelf exemplified in FIG. 8, it is difficult to calculate depths only on the basis of positions of recognized articles, because of an angle of a camera capturing a display image. Nevertheless, the article A2 positioned on the deep side becomes smaller in a captured image than the reference image. Accordingly, the display condition analysis unit 12 can calculate a depth on the basis of a ratio between the reference image and a captured image of the article A2.

As described above, in the present exemplary embodiment, the display condition analysis unit 12 calculates depths where articles are positioned, on the basis of degrees of differences between the sizes of the respective articles in the reference state and sizes of the respective articles recognized from a display image. Thus, even when depths where articles are positioned cannot be known only from the positions of the recognized articles, the depths can be calculated.

There is a possibility that articles are displayed on a display shelf to face in various directions. For this reason, in order to enable the article recognition unit 11 to specify an article, it is appropriate to prepare reference images of the article captured from plural angles. Accordingly, the storage unit 13 may store the reference images of the same article captured from plural directions.

There is an appropriate direction for display of an article. Accordingly, information indicating that the direction is more appropriate among reference images of the same article captured from plural directions may be set in the respective reference images. In this case, the display condition analysis unit 12 may analyze a display state by taking into account not only a depth where each article is positioned, but also a direction of the article. This applies to the other exemplary embodiments. For example, the display condition analysis unit 12 may determine that a display state is more appropriate as the number of articles displayed in appropriate directions is larger.

Exemplary Embodiment 4

Next, description is made about a fourth exemplary embodiment of a display condition analysis device according to the present invention. A configuration of the display condition analysis device of the present exemplary embodiment is also the same as that of the first exemplary embodiment.

In the fourth exemplary embodiment, the display condition analysis unit 12 sets a display image indicating an appropriate display state as a reference state and calculates depths where articles are positioned, on the basis of respective degrees of separation between positions or sizes of respective articles in the reference state and positions or sizes of the respective articles recognized from a newly captured display image. The appropriate display state means a state where articles are displayed at appropriate positions without being in disorder. In the following, the display image indicating the appropriate display state is written as "reference display image". The reference display image is stored in the storage unit 13, for example.

The display condition analysis unit 12 may calculate a depth where an article is positioned, on the basis of a difference (separation degree) between a position of an article in the reference display image and a position of the article in a newly captured display image. For example, the display condition analysis unit 12 may calculate a depth where an article is positioned, on the basis of a difference (separation degree) in size between an article in the reference display image and the article in a newly captured display image. For example, the display condition analysis unit 12 may determine that as the difference is smaller, the article exists on the nearer side to determine that a display state is appropriate.

At this time, it is suitable to use as a reference image a previously captured image of the same range as a range represented by a display image. This is because the captured image of the same range makes it easy to detect the difference.

In the present exemplary embodiment, each article recognized from each display image is compared to calculate a depth where the article is positioned. For this reason, e.g., when a range where articles are placed is almost fixed, depths can be simply calculated.

Exemplary Embodiment 5

Next, description is made about a fifth exemplary embodiment of a display condition analysis device according to the present invention. A configuration of the display condition analysis device of the present exemplary embodiment is also the same as the first exemplary embodiment.

Depending on display shelfs, as an article is displayed on the deeper side, the article sometimes looks darker. Accordingly, in the fifth exemplary embodiment, the display condition analysis unit 12 calculates a depth on the basis of a degree of difference between brightness of a recognized article and a pixel value indicating a reference brightness. The display condition analysis unit 12 may determine that an article darker than the reference brightness is positioned on the deeper side.

For example, when a brightness degree is used as the information indicating brightness, the display condition analysis unit 12 may determine as a brighter article an article whose image is captured to have pixel values closer to white than those for the same kind of another article. Brightness degrees depending on depths in the article shelf may be measured in advance so that the display condition analysis unit 12 calculates a depth by comparison with the brightness degrees.

In the present exemplary embodiment, brightness of an article specified from a display image is compared to calculate a depth where an article is positioned. For this reason, e.g., recognition of a dark part enables determination of its depth without specifying individual articles.

Although the above description is made for each of the exemplary embodiments about the methods in which the display condition analysis unit 12 analyzes a display condition, the display condition analysis unit 12 may combine the methods of analyzing a display condition in the respective exemplary embodiments to determine a display condition. For example, even when it is difficult for one of the methods to calculate depths, another of the methods can calculate the depths in some cases.

For example, like the display image P2 exemplified in FIG. 2, one display image sometimes includes a display shelf whose image is captured from the upper side, and a display shelf whose image is captured from the horizontal direction. In this case, e.g., the display condition analysis unit 12 combines the analysis method described above in the first exemplary embodiment with the analysis method described above in the third exemplary embodiment so that a display condition of each of the display shelves can be analyzed.

Figure 9:
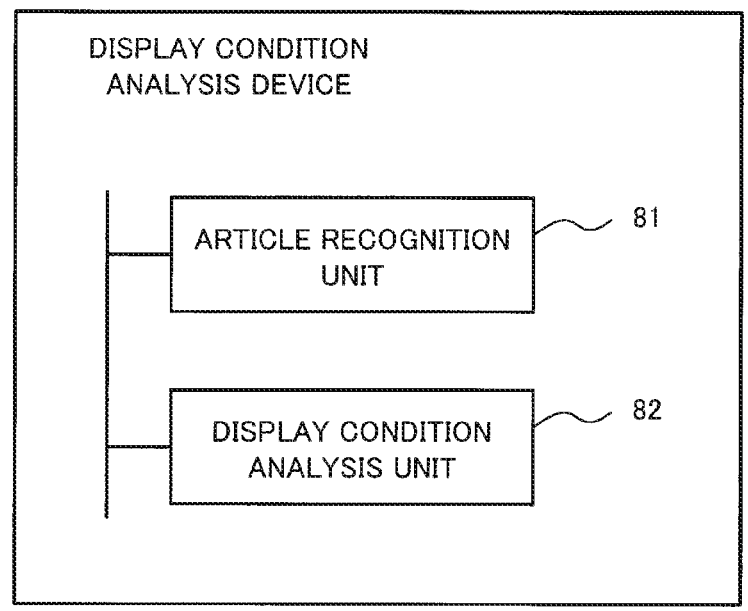
FIG. 9 is a block diagram illustrating an outline of respective exemplary embodiments of the display condition analysis device according to the present invention.

Next, description is made about the outline of the respective exemplary embodiments of the present invention. FIG. 9 is a block diagram illustrating the outline of the respective exemplary embodiments of a display condition analysis device according to the present invention. The display condition analysis device illustrated in FIG. 9 includes an article recognition unit 81 (e.g., the article recognition unit 11) and a display condition analysis unit 82 (e.g., the display condition analysis unit 12, the analysis result processing unit 30). The article recognition unit 81 recognizes articles in a display image from the captured display image of displayed articles (e.g., products). On the basis of positions of the recognized articles (e.g., on the basis of depths where the articles are positioned), the display condition analysis unit 82 analyzes a display condition of the displayed articles.

Such a configuration can analyze a display condition of articles.

Concretely, the display condition analysis unit 82 may calculate depths where articles are positioned, on the basis of distances between positions of the recognized articles and the reference position (e.g., the most front line on a display shelf) in a display image. The display condition analysis unit 82 may analyze a display condition of articles on the basis of a degree of separation between a line connecting positions of the recognized respective articles to each other (e.g., the face line) and a comparison reference line (a reference straight line or a line indicating the most front line on a display shelf) in a display image.

Further, the display condition analysis unit 82 may analyze a display condition of articles as follows. In other words, the display condition analysis unit 82 uses as a reference state sizes of respective articles recognized from a captured display image of the articles displayed at designated positions. Then, the display condition analysis unit 82 may analyze a display condition of articles on the basis of separation degrees (e.g., ratios) between the sizes of the respective articles in the reference state and sizes of the respective articles recognized from a newly captured display image.

Furthermore, the display condition analysis unit 82 may analyze a display condition of articles as follows. In other words, the display condition analysis unit 82 sets a captured display image of an appropriate display state as a reference state. Then, the display condition analysis unit 82 may analyze a display condition of articles on the basis of respective separation or difference degrees (e.g., ratios) between positions or sizes of respective articles in the reference state and positions or sizes of the respective articles recognized from a captured display image.

The display condition analysis unit 82 may include analysis result processing unit (e.g., the analysis result processing unit 30) processing an analyzed display condition of articles. Then, the analysis result processing unit may output an image (e.g., the image exemplified in FIG. 3 or FIG. 7) in a mode enabling recognition of calculated depths where the articles are positioned.

The display condition analysis unit 82 may calculate depths where recognized articles are positioned, to output a display condition on the basis of the depths.

Figure 10:
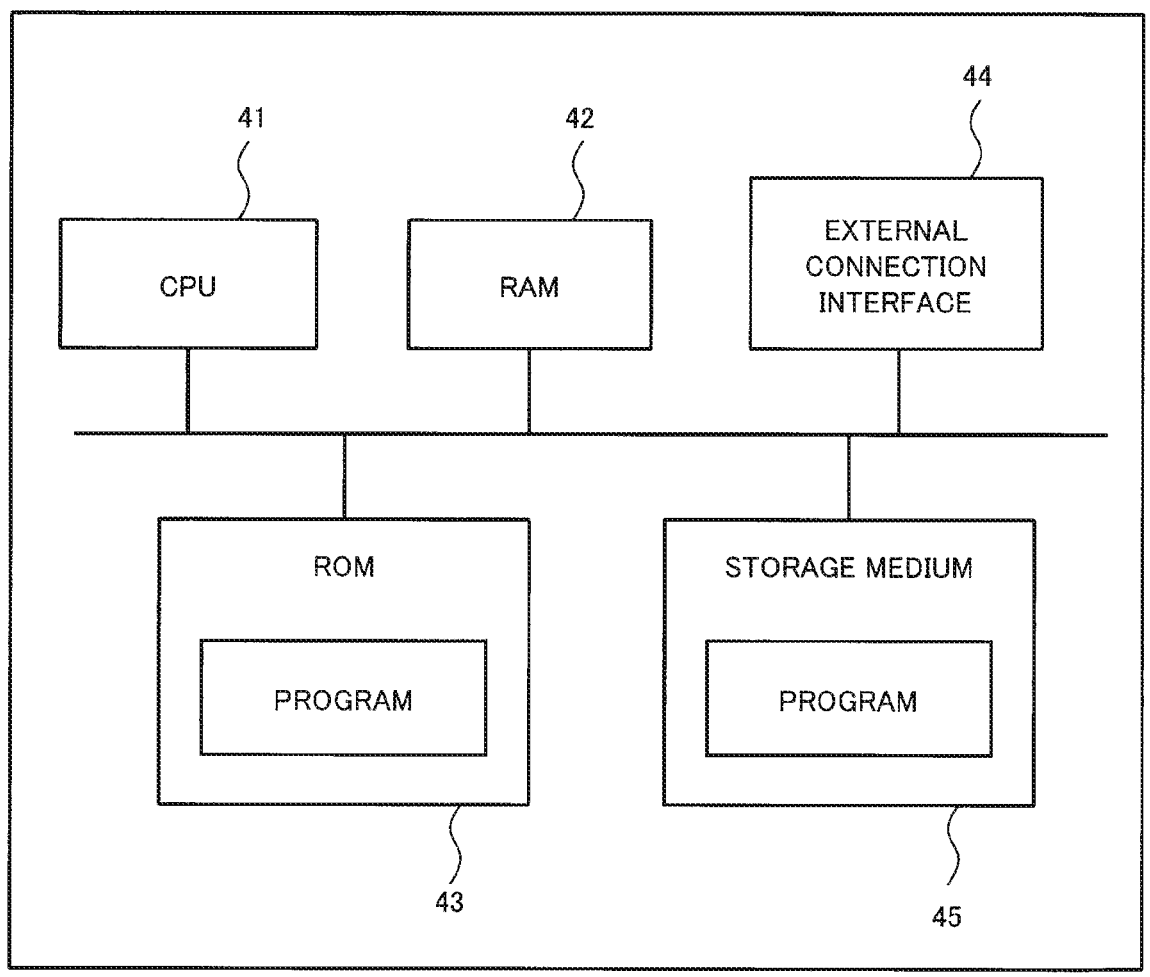
FIG. 10 illustrates an example of a hardware configuration of an information processing device according to the respective exemplary embodiments of the present invention.

Each unit of the display condition analysis device illustrated in FIG. 1 or FIG. 9 is implemented by hardware resources exemplified in FIG. 10. In other words, the configuration illustrated in FIG. 10 includes a central processing unit (CPU) 41, a random access memory (RAM) 42, a read only memory (ROM) 43, an external connection interface 44, and a storage medium 45.

For the above-described respective exemplary embodiments, the case where the function represented by each block in the display condition analysis device illustrated in FIG. 1 or FIG. 9 is implemented by a software program is described above by citing one example in which the function is executed by the CPU 10 illustrated in FIG. 10. Nevertheless, a part or all of the function represented by each block illustrated in FIG. 1 or FIG. 9 may be implemented as hardware.

The display condition analysis device is provided with computer programs that can implement the above-described functions, and the CPU 10 then reads the computer programs out to the RAM 11 to execute the programs so that the present invention described above citing the respective exemplary embodiments can be implemented.

The provided computer programs may be stored in readable and writable memory (temporary storage medium) or a computer-readable storage device such as a hard disk device. In this case, the present invention can be regarded as being configured by codes representing the computer programs or the storage medium storing the computer programs.

Although the description is made above about the invention of the present application with reference to the exemplary embodiments, the invention of the present application is not limited to the above exemplary embodiments. Various modifications that can be understood by a person skilled in the art can be made about a configuration and details of the invention of the present application within the scope of the invention of the present application.

This application is based upon and claims the benefit of priority from Japanese Patent Application No. 2014-049001 filed on Mar. 12, 2014, the entire disclosure of which is incorporated herein.

INDUSTRIAL APPLICABILITY

The present invention can be applied to, e.g., a monitoring device for a display shelf of products, or the like.

REFERENCE SIGNS LIST 10 display condition analysis device
11 article recognition unit
12 display condition analysis unit
13 storage unit
20 image acquisition unit
30 analysis result processing unit
P1, P2, P3 display image
L1, L2 reference line
L3 face line

The invention claimed is:

1. A display condition analysis device comprising:
a memory storing a set of instructions; and
a processor configured to execute the instructions to:
    acquire an image of a display shelf captured by a camera;
    recognize, from the image acquired of the display shelf, two or more products displayed on the display shelf;
    detect a position of each of the two or more products in the image acquired;
    compare each point of a plurality of points of a line connecting the positions of the two or more products with a comparison reference line;
    analyze a display condition of each of the two or more products based on a degree of separation between each point of the plurality of points of the line connecting the positions of the two or more products and the comparison reference line;
    generate a heat map based on the display condition; and
    display, on a display, the heat map superimposed on the image of the display shelf, the heat map color-coded in accordance with a magnitude of display disorder of the two or more products on the display shelf.

2. The display condition analysis device according to claim 1, wherein the processor is further configured to execute the instructions to:
    generate a display image highlighting a region of the two or more products recognized; and
    display the display image on the display.

3. The display condition analysis device according to claim 1, wherein
    the comparison reference line is a front line of the display shelf.

4. The display condition analysis device according to claim 1, wherein the processor is further configured to execute the instructions to:
    analyze the display condition of the product, based on the position of each of the two or more products in a reference image and the position of each of the two or more products in the image acquired.

5. The display condition analysis device according to claim 1, wherein the display condition includes an out of stock and disorder in a store.

6. The display condition analysis device according to claim 1, wherein the processor is further configured to execute the instructions to:
    output an image in a state in which the degree of separation is recognizable.

7. The display condition analysis device according to claim 1, wherein the processor is further configured to execute the instructions to:
    display an image emphasizing an area.

8. The display condition analysis device according to claim 1, wherein the processor is further configured to execute the instructions to:
    display an image indicating disorder on the image acquired.

9. The display condition analysis device according to claim 1, wherein the processor is further configured to execute the instructions to:
    analyze the display condition based on comparison of the positions of the two or more products in the image acquired with appropriate positions of the two or more products on the display shelf.

10. A display condition analysis method performed by a computer and comprising:
    acquiring an image of a display shelf captured by a camera;
    recognizing, from the image acquired of the display shelf, two or more products displayed on the display shelf;
    detecting a position of each of the two or more products in the image acquired;
    comparing each point of a plurality of points of a line connecting the positions of the two or more products with a comparison reference line;
    analyzing a display condition of each of the two or more products based on a degree of separation between each point of the plurality of points of the line connecting the positions of the two or more products and the comparison reference line;
    generating a heat map based on the display condition; and
    displaying, on a display, the heat map superimposed on the image of the display shelf, the heat map color-coded in accordance with a magnitude of display disorder of the two or more products on the display shelf.

11. A computer readable non-transitory recording medium storing program causing a computer to execute:
    acquiring an image of a display shelf captured by a camera;
    recognizing, from the image acquired of the display shelf, two or more products displayed on the display shelf;
    detecting a position of each of the two or more products in the image acquired;
    comparing each point of a plurality of points of a line connecting the positions of the two or more products with a comparison reference line;

analyzing a display condition of each of the two or more products based on a degree of separation between each point of the plurality of points of the line connecting the positions of the two or more products and the comparison reference line;
generating a heat map based on the display condition; and
displaying, on a display, the heat map superimposed on the image of the display shelf, the heat map color-coded in accordance with a magnitude of display disorder of the two or more products on the display shelf.

\* \* \* \* \*